(12) United States Patent
Chen et al.

(10) Patent No.: US 7,685,078 B2
(45) Date of Patent: Mar. 23, 2010

(54) METHOD AND APPARTUS FOR USING B MEASURES TO LEARN BALANCED RELEVANCE FUNCTIONS FROM EXPERT AND USER JUDGMENTS

(75) Inventors: Keke Chen, Sunnyvale, CA (US); Ya Zhang, Sunnyvale, CA (US); Zhaohui Zheng, Sunnyvale, CA (US); Hongyuan Zha, Norcross, GA (US); Gordon Sun, Redwood Shores, CA (US)

(73) Assignee: Yahoo! Inc., Sunnyvale, CA (US)

( * ) Notice: Subject to any disclaimer, the term of this patent is extended or adjusted under 35 U.S.C. 154(b) by 518 days.

(21) Appl. No.: 11/755,134

(22) Filed: May 30, 2007

(65) Prior Publication Data

US 2008/0301069 A1 Dec. 4, 2008

(51) Int. Cl.
*G06N 5/00* (2006.01)
(52) U.S. Cl. ......................................... 706/12; 706/45
(58) Field of Classification Search .................. 706/12, 706/23, 45; 600/532
See application file for complete search history.

(56) References Cited

U.S. PATENT DOCUMENTS 5,355,893 A * 10/1994 Mick et al. .................. 600/532
7,499,894 B2 * 3/2009 Marom et al. ................. 706/23

* cited by examiner

*Primary Examiner*—Wilbert L Starks, Jr.
(74) *Attorney, Agent, or Firm*—Seth H. Ostrow; Ostrow Kaufman & Frankl LLP

(57) ABSTRACT

The present invention relates to systems and methods for determining a content item relevance function. The method comprises collecting user preference data at a search provider for storage in a user preference data store and collecting expert-judgment data at the search provider for storage in an expert sample data store. A modeling module trains a base model through the use of the expert-judgment data and tunes the base model through the use of the user preference data to learn a set of one or more tuned models. A measure (B measure) is designed to evaluate the balanced performance of tuned model over expert judgment and user preference. The modeling module generates or selects the content item relevance function from the tuned models with B measure as the selection criterion.

24 Claims, 3 Drawing Sheets

US 7,685,078 B2

METHOD AND APPARTUS FOR USING B MEASURES TO LEARN BALANCED RELEVANCE FUNCTIONS FROM EXPERT AND USER JUDGMENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

Systems, methods and computer program products in accordance with embodiments of the invention are directed towards machine learning a content item relevance function. More specifically, embodiments of the invention are directed towards machine learning a content item relevance function on the basis of expert-judgment data that is tuned through the use of user preference data to achieve balanced performance over both types of data.

BACKGROUND OF THE INVENTION

Web search is becoming an increasingly important tool in the lives of millions of individual users to identify relevant content items from among the billions of content items that are accessible on the Internet. These content items are highly diversified in terms of content, format and quality and ranking content items from the web to find the most relevant content item in response to a given query from such a huge amount of diversified data is one of the basic challenges for search engines. Accordingly, machine learning of relevance functions has become a widespread solution to ranking content items where labeled training data is available. Labeled data comprises one or more query-content item pairs with an accompanying judgment as to the relevance of the pair.

When labeling web search results, a given user (who may be a relevance expert) provides a label in accordance with certain enumerated guidelines. These guidelines roughly measure an observed relevance between a query and a content item, e.g., a web page. Moreover, such labeling is usually performed by experts in assessing the relevance of a content item to a query. Such expert-judged training examples have a number of advantages. For example, the queries for judgment may be carefully selected for different purposed and the judged results can be thoroughly verified and tuned. Due to such properties, expert-judged training examples are often regarded as the "gold set" for use in training of a machine learned relevance function. It is very costly, however, for humans to manually label a large number of web search examples, which is required for effectively learning complicated models such as those for modeling web-based content item relevance. There are those that may also argue that the opinions of a few experts regarding relevance may not be representative enough for a highly diverse user population.

Recently, implicit relevance judgments have been derived from user clickthrough logs, which is an appealing source of training data for machine learning of content item relevance functions due to the low cost of obtaining such relevance examples. Expert-judged relevance and clickthrough data, however, have significant difference due to the data sources and the methods of gathering the data. Specifically, compared to expert-judged examples, user preference data (clickthrough data) can be more dynamic and therefore better represent the "epidemic" topics such as movies, fashion, recent events, user group biased searches, etc.

One unique feature of user preference data is so called "reigonality"—for a given query users from a given region may be more interested in a particular URL than users from other regions. This may result in a significant difference between user preference and expert judgment. Some distinct properties of user preference data versus expert judgment are summarized as follows:

Expert judged relevance samples are often small scale and costly to obtain, reflecting the relevance judgment of a small number of people who follow non-volatile judgment criteria. These relevance judgments are usually also labeled in accordance with an absolute ranking.

Implicit relevance samples (clickthrough data or user preference data) are inexpensive to obtain in large volumes and reflect the opinions of a large number of users over the search results they receive from a search engine. One drawback is that this data is often noisy and may possibly change as a function of time, but nonetheless captures most users' interest. Additionally, using such data only provides preferences in the form of a pair of content items $(d_1, d_2)$, where content item $d_1$ is more relevant to the query q than $d_2$.

Due to the differing nature of these two types of data, it is possible that they are inconsistent modeling content item relevance functions. Thus, systems, methods and computer program products are needed to take advantage of and combine both expert-judged relevance samples and user preference data when training a model to determine a content item relevance function.

SUMMARY OF THE INVENTION

The present invention is directed towards methods, systems and computer readable media comprising program code for combining expert-judgment data and user preference data and balancing the two in training a content item relevance function. A method for determining a content item relevance function according to one embodiment of the present invention comprises collecting user preference data at a search provider for storage in a user preference data store and collecting expert-judgment data at the search provider for storage in an expert sample data store. A modeling module trains a base model through the use of the expert-judgment data and tunes the base model through the use of the user preference data to learn a set of tuned models. A measure is developed to evaluate the balanced performance of a tuned model over both expert-judgment data and user preference data. The tuned model with the best balanced-performance is selected as the content item relevance function.

Collecting user preference data may comprise clickthrough data, which a search engine may collect by recording user queries and the selection of content items in search result sets that are responsive to the queries. Collecting clickthrough data may also comprise storing the clickthrough data as a relative relevance for a pair of content items in conjunction with a given query. Collecting expert-judgment data according to one embodiment of the present invention comprises collecting a relevance label for a given query-content item pair. Collecting the relevance label may comprise collecting an ordinal value that represents a given relevance level.

The modeling module trains the base model, which may comprise training a hyper linear model; the hyper linear model according to one embodiment comprising training a Gradient Boosting Tree (GBT) model. Tuning the base model may comprise adjusting the weights of the hyper linear model to fit the user preference data. Tuning the base model may also comprise optimizing a loss function. The loss function may be optimized through the use of a number of optimization techniques including, but not limited to, a mean square error loss function and a hinge loss function. The mean squared error loss function may itself be optimized through the use of stochastic gradient descent or closed form optimization and a measure (B measure) is designed to evaluate the balanced performance over the expert judgment and user preference data. The tuned model with the best balanced-performance is selected as the content item relevance function.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
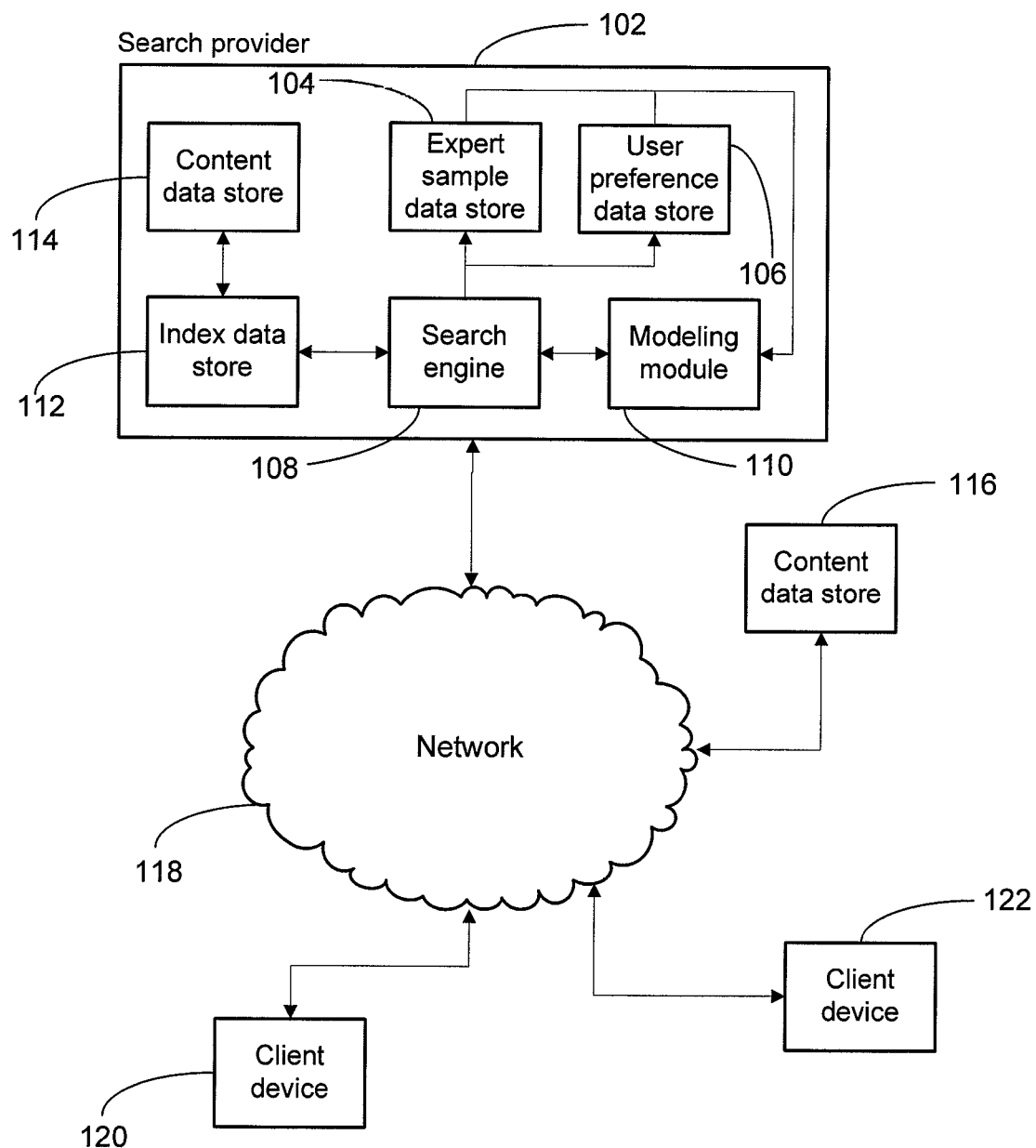
FIG. 1 presents a block diagram illustrating a system for training a model to determine a content item relevance function by combining expert-judgment data and user preference data according to one embodiment of the present invention.

FIG. 1 presents a block diagram illustrating a system for training a model to determine a content item relevance function through the combination of expert-judgment data and user preference data according to one embodiment of the present invention. According to the embodiment illustrated in FIG. 1, one or more client devices 120 and 122 are communicatively coupled to a network 118, which may include a connection to one or more local and wide area networks, such as the Internet. According to one embodiment of the invention, a given client device 120 and 122 is general-purpose personal computer comprising a processor, transient and persistent storage devices, input/output subsystem and bus to provide a communications path between components comprising the general-purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

Also in communication with the network 118 is a search provider 102. The search provider 102 according to the embodiment illustrated by FIG. 1 comprises a search engine 108, an index data store 112, an expert sample data store 104, a user preference data store 106 and a modeling module 110. The search engine 108 may operate in accordance with information retrieval techniques known to those of skill in the art. For example, the search engine 108 may be operative to maintain an index in the index data store 112, the index according to one embodiment comprising a list of word-location pairs (in addition to other data). When the search engine 108 receives a query, the search engine traverses the index at the index data store 112 to identify content items that are relevant to the query, e.g., those content items that comprise the query terms.

The index at the index data store 112 may be operative to index content items located at both local and remote content data stores, 114 and 116, respectively. As is described in greater detail herein, the search engine 108 may use systems and methods in accordance with embodiments of the present invention to determine the relevance of a given content item to a given query for use in selecting and ranking content items for display to a user issuing the given query.

The search provider 102 may comprise an expert sample data store 104 that is operative to maintain query-content item training examples that relevance experts label in accordance with one or more guidelines. A set of labels, L, which may be a finite ordinal set, may comprise a plurality of integer grades (e.g., five grades) that represent the relevance level of a content item d to a given query q. Where the value l represents a grade of a label, the expert sample data store 104 may maintain a given training sample as the tuple (q, d, l). For a given query q, one or more expert-judged examples $\{(q, d_i, l_i)\}$ may be ordered according to the labels $l_i$, which according to one embodiment provides an optimal ranking. Metrics such as DCG or NDCG, which are well known to those of skill in the art, may be used to evaluate the quality of an arbitrary ranking $\{(q, d_i, l_i)\}$.

In addition to the expert sample data store 104, the search provider 102 may comprise a user preference data store 106 that is operative to maintain user preference examples that the search engine 108 provides via clickthrough logs that the search engine 108 is operative to maintain. According to embodiments of the invention, the user preference data store 106 is operative to maintain user preference samples as pairwise samples that represent a relative relevance for a pair of content items $(d_1, d_2)$. The user preference data store 106 may be further operative to represent a user preference sample as $(q, d_1, d_2)$, where $d_1$ is more relevant to query q than $d_2$. The user preference data store 106 may also use the notation $d_1 >_r d_2$ to represent the relative relevance between two content items.

The modeling module 110 is operative to receive expert-judgment data from the expert judgment data store 104 and user preference data (clicks) from the user preference data store 106, which the modeling module 110 uses to determine a content item relevance function for use by the search engine 108 in determining the relevance of a content item to a given query. According to one embodiment, the modeling module operates in accordance with a first phase and a second phase. According to the first phase, the modeling module 110 is operative to generate a base model with expert-judgment training data, which is denoted as $h(w_0, x)$, where $w_0$ is the model parameter and x is the feature vector for a given query-content item pair (q, d). According to the second phase, the modeling module 110 is operative to tune the model parameter $w_0$ with the set of user preference data under an empirical risk minimization ("ERM") framework as Equation A illustrates:

$$\underset{w}{\operatorname{argmin}}\left\{\frac{1}{n}\sum_{i=1}^{n}L(h(x_i, w), l_i) + \lambda\|w - w_0\|^2\right\} \quad \text{Equation A}$$

According to Equation A, L represents a loss function and $\lambda$ represents a regularizor constraining the deviation of w from original model parameter $w_0$. $\lambda$ serves as the tuning parameter in training the tuned models. The embodiment of L may include a mean square error loss function, and hinge loss function, etc.

Turning to the first phase, the modeling module 110 according to one embodiment builds a hyper linear model to transform one or more original feature vectors that describe a given expert-judgment sample into one or more subsequent feature vectors. Accordingly, the modeling module 110 may learn a linear model that may be on the basis of the one or more subsequent feature vectors. By using a hyper linear model, the modeling module 110 may further implement multiple optimization techniques, which are described in greater detail herein, on the basis of the framework of Equation A.

Let H be a set of feature transformation function, with a given feature transformation function operative to transform feature vectors in $d_0$-dimension vector space $R^{d_0}$ to a $d_1$-dimension space $R^{d_1}$ as Equation B illustrates:

$$H: R^{d_0} \rightarrow R^{d_1} \quad \text{Equation B}$$

Further assume there is a subset of functions, $h_i$, $h_i \in H$, $i=1, \ldots, i$, so that the modeling module 110 may satisfactorily model $h(w_0, x)$ expanded by the base functions $h_i$ and subvectors in the form that Equation C illustrates, where $w_0^T = [w_{0,1}, \ldots, w_{0,k}]$:

$$h(w_0, x) = \sum_{i=1}^{k} w_{0,i}^T h_i(x) \quad \text{Equation C}$$

Let $h_i^T$ be the transpose of the transformed feature vector $h_i(x)$ and let $h^T(x)=[h_1^T, \ldots, h_{1k}^T]$, such that the modeling module 110 generates the resultant hyper linear model of Equation D:

$$h(w_0, x) = w_0^T h \quad \text{Equation D}$$

In the resultant hyper linear model, the modeling module 110 transforms the original vector space to a subsequent space that $[h_1^T, \ldots, h_{1k}^T]$ represents, thereby generating a linear model that provides high accuracy in predicting a content item relevance function.

The form of Equation C may take the form of a base expansion model, a boosting model, an additive model, etc. According to one embodiment, the modeling module 110 implements the hyper linear model as a Gradient Boosting Tree ("GBT") model to model the expert-judged samples that the expert sample data store 104 is operative to maintain. The GBT model generates a set of one or more decision trees, $h_i$, with a given decision tree comprising m leaf nodes. The modeling module 110 uses gradient boosting to learn the structure of the one or more decision trees and the weighting vector w for the leaf nodes—for the leaf node $e_{ij}$ in the tree $h_i$, a weight $w_{ij}$ is assigned as the result of training. When the modeling module 110 applies the TreeBoost model to predict a target value of a given original feature vector x, a given tree i is applied to the vector x, with the modeling module 110 generating one selected leaf node. The final TreeBoost output is the sum of the outputs of the decision trees.

The modeling module 110 uses the expert-judged samples to train a base model, which may be a hyper linear model, and incorporates the user preference data from the user preference data store 106 to refine the base model. A unique benefit of using a hyper linear model is that the modeling module 110 may tune the weight of vector $w_0$ while the functions $h_i$ remain unchanged, which simplifies the optimization of Equation A. The modeling module 110 defines a delta feature $\Delta x_{d1,d2} = h(x_{d1}) - h(x_{d2})$ and a delta function f for a given user preference data training sample $(d_1, d_2)$ according to Equation E:

$$f(w_0, \Delta x_{d_1,d_2}) = h(w_0, x_{d_1}) - h(w_0, x_{d_1}) \quad \text{Equation E}$$
$$= w_0^T (h(x_{d_1}) - h(x_{d_2}))$$
$$= w_0^T \Delta x_{d_1,d_2}$$

The modeling module 110 may correspondingly define a delta label according to Equation F:

$$\Delta l_{d_1,d_2} = \begin{cases} 1 & d_1 >_r d_2 \\ -1 & d_2 >_r d_1 \end{cases} \quad \text{Equation F}$$

By definition, where $f(w_0, \Delta x_{d1, d2}) > 0$, the modeling module 110 determines the relationship $d_1 >_r d_2$, otherwise $d_2 >_r d_1$.

With the linearized base model and fixed base functions h1, the modeling module 110 selects a loss function to optimize Equation A. According to various embodiments of the invention, the modeling module 110 may implement one of two types of loss functions: an MSE loss function (normally used in regression modeling) and a hinge loss function (typically used in Support Vector Machine modeling).

When using an MSE loss function in the framework of Equation A for incorporating user preference data, the modeling module 110 may define the loss function in accordance with Equation G as follows:

$$L_{MSE}(f(w,\Delta x),\Delta l) = (f(w,\Delta x) - \Delta l)^2 \quad \text{Equation G}$$

If there are n pairs in the training data set, the modeling module 110 may implement the framework of Equation A in accordance with Equation H as follows:

$$\underset{w}{\operatorname{argmin}}\left\{\frac{1}{n}\sum_{i=1}^{n}(f(w, \Delta x_i) - \Delta l_i)^2 + \lambda\|w - w_0\|^2\right\} \quad \text{Equation H}$$

where the initial value of the weight vector w is set to $w_0$, e.g., the weight vector for the base model. By minimizing the loss function, the modeling module 110 may learn a content item relevance function that is based on expert-judgment data that is tuned in accordance with user preference data.

According to various embodiments, the modeling module 110 may optimize the loss function of Equation H through the use of a stochastic gradient descent ("SGD"). SGD follows the idea of gradient descent, but in a given iteration the modeling module 110 chooses one or more data samples to calculate the gradient and uses this gradient to revise the weight vector w. Table A illustrates one embodiment of an algorithm for performing SGD:

TABLE A

Algorithm 1 SGD({Δx}, {Δl}, w₀, h, λ, n)

Input: {Δx}: the set of Delta feature vectors from
the pairwise training examples, {Δl}: the corresponding
Delta labels, w₀: the inital weights, h: the base model,
i.e., the trees, $h_j$ generated by TreeBoost, λ: regulariza-
tion factor, n: the number of iterations
Output: w: the refined weights
   w ← w₀
   for i = 1 to n do
      j ← random number in the range of [1, length of {Δx}]
      g ← (wΔ$x_j$ – Δ$l_j$) * Δ$x_j$ + λ(w – w₀)

$$s = \min\left(\frac{1}{\text{length}(w)}, \frac{1}{i}\right)$$

w ← w – s * g
   end for

Figure 2:
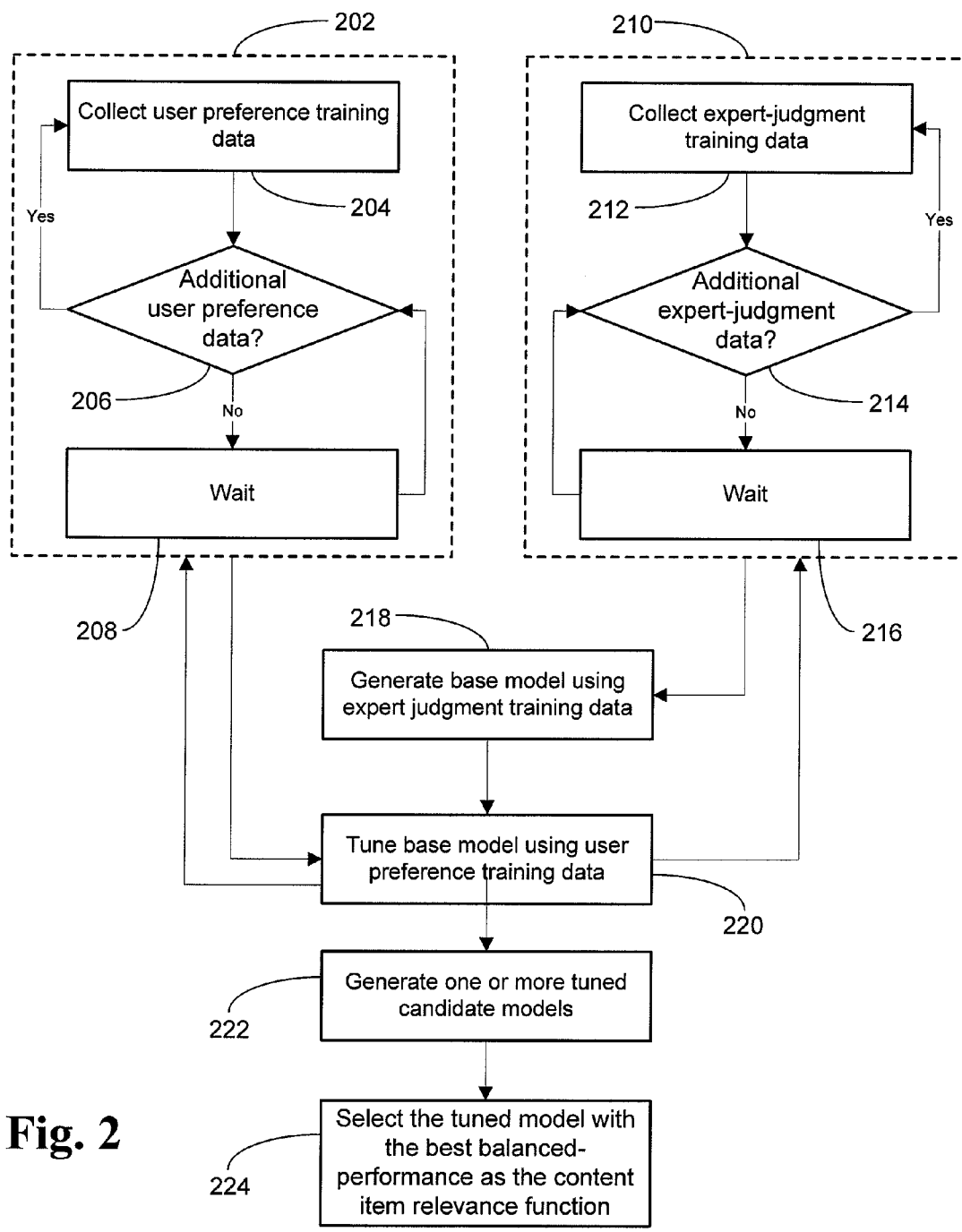
FIG. 2 presents a flow diagram illustrating a method for training a model to determine a content item relevance function by combining expert-judgment data and user preference data according to one embodiment of the present invention.

FIG. 2 illustrates a method for training a model to determine a content item relevance function through the combination of expert-judgment data and user preference data according to one embodiment of the present invention. According to the embodiment of FIG. 2, a user preference data collection process, step 202 takes place in conjunction with an expert-judgment data collection process, step 210, which according to one embodiment may take place in parallel.

The user preference data collection process, step 202, begins with the collection of one or more items of user preference data, step 204, which may be obtained by accessing clickthrough logs that a search engine maintains, for storage on a user preference data store. The process executes a check to determine if additional user preference data is available for collection, step 206. If additional user preference data is available, processing returns to step 204 with the collection and storage of the user preference data. Where step 206 evaluates to false, e.g., there is currently no user preference data available for collection, the process enters a wait state, step 208, periodically awakening with processing returning to step 206 to determine if additional user preference data is available for collection and storage.

The expert-judgment data collection process, step 210, begins with the collection of one or more items of expert-judgment data, step 212, which may be obtained by presenting a query-content item pair to a relevance expert (who may be a typical or atypical user) for labeling with a relevance label. According to one embodiment, an expert sample data store is operative to maintain the labeled expert-judgment data. The process executes a check to determine if additional expert-judgment data is available for collection, step 214. If additional expert-judgment data is available, processing returns to step 212 with the collection and storage of the expert-judgment data. Where step 214 evaluates to false, e.g., there is currently no expert judgment data available for collection, the process enters a wait state, step 216, periodically awakening with processing returning to step 214 to determine if additional expert-judgment data is available for collection and storage.

A base model is generated using the collected expert judgment training data, step 218. According to one embodiment, a modeling module performs generation of the base model on a periodic basis. The base model may comprise a hyper linear model, such as a TreeBoost model. The base model being built on the basis of the expert-judgment data, step 210. The modeling module tunes the base model, step 220, the tuning made on the basis of the user preference data, step 202.

Several tuned models may be generated as candidate models, step 222, wherein the following B measure may also be used to evaluate the balanced performance over both expert judgment data and user preference data. μ represents the performance on expert judgment: one embodiment is normalized discounted cumulative grades ("NDCG"). ν represents the performance on user preference data: one embodiment is pair precision. According to one embodiment μ and ν should be in the same range, e.g., both NDCG and pair precision are in [0, 1].

$$B = \frac{2\mu \cdot \nu}{\mu + \nu} \quad \text{Equation I}$$

The B measure may be further tuned with a parameter α, as shown in Equation J, to favor the performance over one type of data. For example, α=2 weights ν as being two times important as μ.

$$B_\alpha = \frac{(1+\alpha) \cdot \mu \cdot \nu}{\alpha \cdot \mu + \nu} \quad \text{Equation J}$$

The B measure is then used to select the tuned model with the best balanced-performance as the content item relevance function, step 224, which a search engine may use to determine the relevance of an unlabeled content item to a given query.

Figure 3:
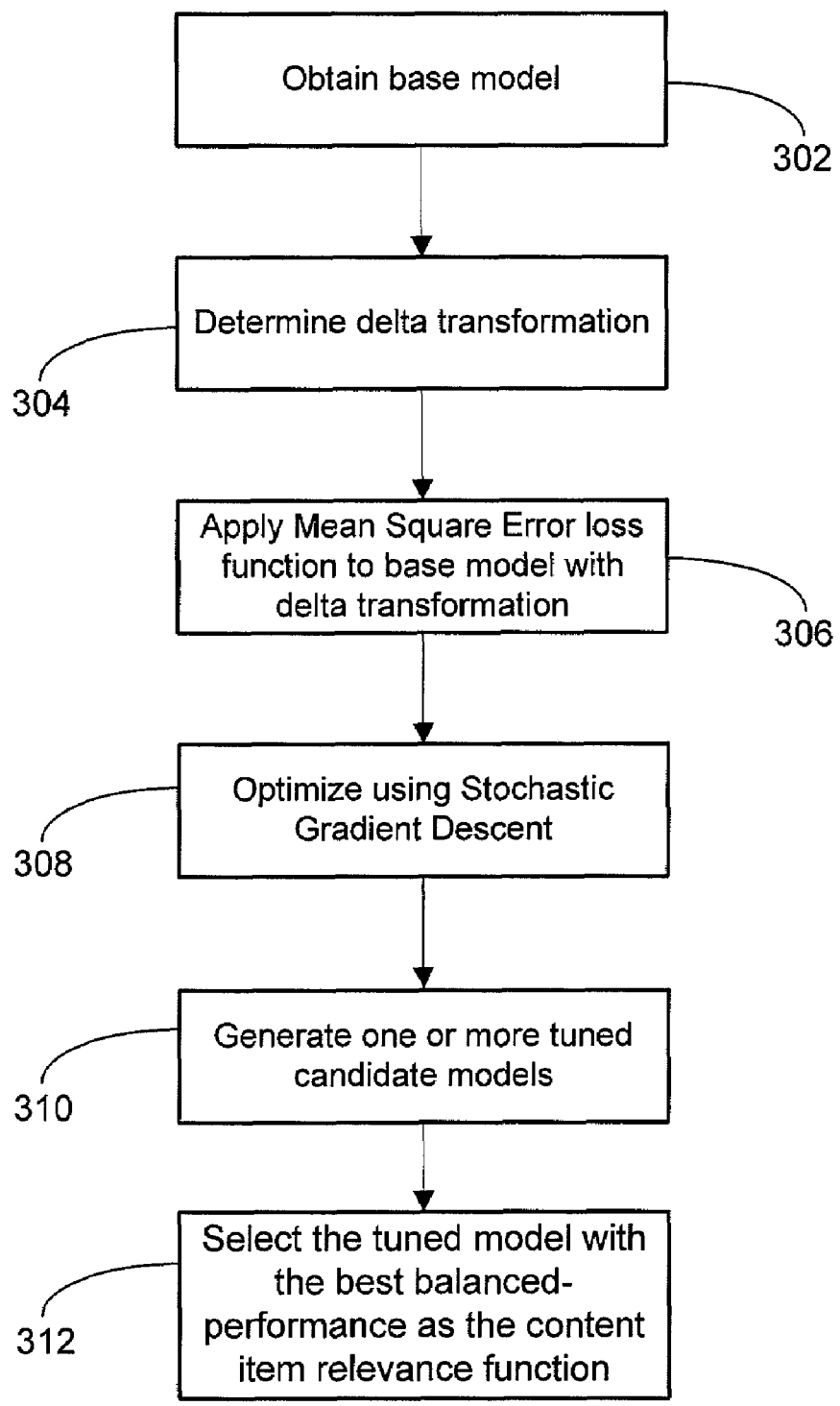
FIG. 3 presents a flow diagram illustrating a method for tuning an expert-judgment model by the incorporation of user preference data through the use of an MSE loss function according to one embodiment of the present invention.

As described herein, the modeling module may tune a base model trained on expert-judgment data to include user preference data. FIG. 3 presents a flow diagram illustrating a method for tuning an expert-judgment model by the incorporation of user preference data through the use of an MSE loss function according to one embodiment of the present invention. According to the embodiment of FIG. 3, the modeling module obtains a base model, which may comprise generating a hyper linear model on the basis of expert-judgment data, step 302.

A delta transformation is determined for the model, step 304, which may be determined in accordance with the formulas of Equation E and Equation F. The modeling module applies a mean square error loss function to the base model with the delta transformation, step 306. Furthermore, the modeling module may optimize the mean square error loss function through the use of stochastic gradient descent, step 308, as is described herein. Several tuned models may be generated as candidate models, step 310, wherein the B measure may also be used to evaluate the balanced performance over both expert judgment data and user preference data. The B measure is then used to select the tuned model with the best balanced-performance as the content item relevance function, step 312, which a search engine may use to determine the relevance of an unlabeled content item to a given query.

FIGS. 1 through 3 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A computer implemented method for determining a content item relevance function, the method comprising:
    collecting user preference data at a search provider for storage in a user preference data store;
    collecting expert-judgment data at the search provider for storage in a expert sample data store;
    training a base model by a modeling module through the use of the expert-judgment data;
    tuning the base model by the modeling module through the use of the user preference data to learn a set of one or more tuned models, wherein tuning the base model comprises optimizing a loss function;
    applying a B measure to evaluate the balanced performance of the tuned models over the expert-judgment data and the user preference data; and
    selecting the tuned model with the best balanced-performance as the content item relevance function.

2. The method of claim 1 wherein collecting user preference data comprises collecting clickthrough data.

3. The method of claim 1 wherein collecting clickthrough data comprises storing the clickthrough data as a relative relevance for a pair of content items in conjunction with a given query.

4. The method of claim 1 wherein collecting expert-judgment data comprises collecting a relevance label for a given query-content item pair.

5. The method of claim 4 wherein collecting the relevance label comprises collecting an ordinal value.

6. The method of claim 1 wherein training a base model comprises training a hyper linear model.

7. The method of claim 6 wherein training the hyper linear model comprises training a TreeBoost model.

8. The method of claim 6 wherein tuning the base model comprises adjusting the weights of the hyper linear model to fit the user preference data.

9. The method of claim 1 wherein optimizing the loss function comprises optimizing in accordance with a mean square error loss function.

10. The method of claim 9 comprising optimizing the mean square error loss function through the use of stochastic gradient descent.

11. The method of claim 1 wherein optimizing the loss function comprises optimizing in accordance with a hinge loss function.

12. The method of claim 1 comprising generating a measure for the evaluation of a balance of performance over the expert-judgment data and the user preference data.

13. The computer readable media of claim 1 comprising program code for generating a measure for the evaluation of a balance of performance over the expert-judgment data and the user preference data.

14. Computer readable media comprising program code that when executed by a programmable processor causes the programmable processor to execute a method for determining a content item relevance function, the computer readable media comprising:
    program code for collecting user preference data at a search provider for storage in a user preference data store;
    program code for collecting expert-judgment data at the search provider for storage in a expert sample data store;
    program code for training a base model by a modeling module through the use of the expert-judgment data;
    program code for tuning the base model by the modeling module through the use of the user preference data to learn a tuned based model, wherein program code for tuning the base model comprises program code for optimizing a loss function;

program code for generating the content item relevance function from the tuned based model; and program code for evaluating the balanced performance on expert judgment and user preference.

15. The computer readable media of claim 14 wherein program code for collecting user preference data comprises program code for collecting clickthrough data.

16. The computer readable media of claim 14 wherein program code for collecting clickthrough data comprises program code for storing the clickthrough data as a relative relevance for a pair of content items in conjunction with a given query.

17. The computer readable media of claim 14 wherein program code for collecting expert-judgment data comprises program code for collecting a relevance label for a given query-content item pair.

18. The computer readable media of claim 17 wherein program code for collecting the relevance label comprises program code for collecting an ordinal value.

19. The computer readable media of claim 14 wherein program code for training a base model comprises program code for training a hyper linear model.

20. The computer readable media of claim 19 wherein program code for training the hyper linear model comprises program code for training a TreeBoost model.

21. The computer readable media of claim 19 wherein program code for tuning the base model comprises program code for adjusting the weights of the hyper linear model to fit the user preference data.

22. The computer readable media of claim 14 wherein program code for optimizing the loss function comprises program code for optimizing in accordance with a mean square error loss function.

23. The computer readable media of claim 22 comprising program code for optimizing the mean square error loss function through the use of stochastic gradient descent.

24. The computer readable media of claim 14 wherein program code for optimizing the loss function comprises program code for optimizing in accordance with a hinge loss function.

* * * * *